3,690,858
COMBATING WEEDS AND ALGAE WITH 2-CHLORO-5-ARYL-1,3,4-THIADIAZOLES
Norman A. Dahle, Mission, Kans., assignor to Gulf Research & Development Company, Pittsburgh, Pa.
No Drawing. Filed Oct. 24, 1969, Ser. No. 869,329
Int. Cl. A01n 9/12
U.S. Cl. 71—67                                2 Claims

ABSTRACT OF THE DISCLOSURE 5-aryl-tetrazoles may be reacted with thiophosgene to yield 2-chloro-5-aryl-1,3,4-thiadiazoles which have unusually selective phytotoxic properties, being particularly useful in combating crabgrass and algae.

DESCRIPTION OF INVENTION

It has been discovered that a relatively small class of compounds having the structural formula,

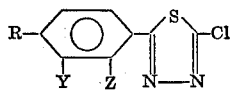

in which X, Y and Z are selected from the group consisting of hydrogen, chloro and methyl have unusually specific selective herbicidal action, particularly against crabgrass and algae, and may be made by a method which is both novel and convenient. The synthesis and use of these compounds is discussed below, with specific examples presented by way of illustration.

SYNTHESIS PROCEDURE

5-aryl-tetrazoles

The tetrazole starting material used in this synthesis scheme was prepared by the method of W. G. Finnegan, R. A. Henry and R. Lofquist which utilizes the reaction of an arylnitrile with a mixture of ammonium chloride and sodium azide in dimethyl formamide containing a catalytic amount of lithium chloride:

Finnegan, W. G., Henry, R. A., and Lofquist, R., J. Am. Chem. Soc. 80, 3908 (1958) and U.S. Pat. 2,977,372.

The following procedure is representative of the novel method of synthesis of the 2-chloro-5-aryl-1,3,4-thiadiazoles.

2-chloro-5-phenyl-1,3,4-thiadiazole

A stirred mixture of 74.4 g. (0.50 mole) of 5-phenyl-2H-tetrazole and 74.0 g. (0.65 mole) of thiophosgene in 550 ml. of dimethoxyethane was allowed to reflux overnight. The reaction mixture was cooled and filtered. The filtrate was taken to dryness at reduced pressure and the resulting residue leached with two 220-ml. portions of hexane. Upon cooling and concentration of the combined hexane portions 40.5 g. of the desired product was obtained: M.P. 82–84° (lit. 86–88°).

The reaction with thiophosgene probably produces initially a relatively unstable intermediate product which then undergoes thermal decomposition and rearrangement. Better results are obtained by using an efficient non-reactive solvent to achieve homogenous reaction conditions and heating the mixture to yield the final product, without attempting to isolate an intermediate reaction product.

Use of the 2-chloro-5-aryl-1,3,4-thiadiazoles as herbicides

So as to illustrate clearly the selective phytotoxic properties of the herbicides, a group of controlled greenhouse experiments is described below.

(1) POST-EMERGENT USE

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots were sprayed with an aqueous dispersion of the active compound prepared as described above, at a rate of 5 lb. of active compound per acre and at a spray volume of 60 gallons per acre. Approximately one week after the spray application the plants were observed and the results rated according to the following schedule:

| Type of action: | Degree |
|---|---|
| C=chlorosis (bleaching) | 0=no effect. |
| N=necrosis | 1=slight effect. |
| G=growth inhibition | 2=moderate effect. |
| F=formative effect (abnormal form of growth) | 3=severe effect. |
| K=non-emergence | 4=maximum effect (all plants died). |

The same rating schedule was employed to judge pre-emergent results obtained according to the procedure below.

(2) PRE-EMERGENT USE

A solution of each active compound was prepared by dissolving 290 mg. of the compound to be tested in 200 ml. of acetone. Disposable paper trays about 2 inches deep and half the size of ordinary greenhouse flats were prepared and seeded with a variety of species of plant seeds, then sprayed with the acetone solution at the rate of 10 lb. of active chemical per acre of sprayed area. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and herbicidal effect was rated according to the above schedule.

Both post-emergent and pre-emergent results are set forth in the following table.

HERBICIDAL ACTIVITY OF 2-CHLORO-5-ARYL-1,3,4-THIADIAZOLES

| Structural formula and B.P or M.P. | | Crabgrass | Coxcomb | Brome | Millet | Soybean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|
| 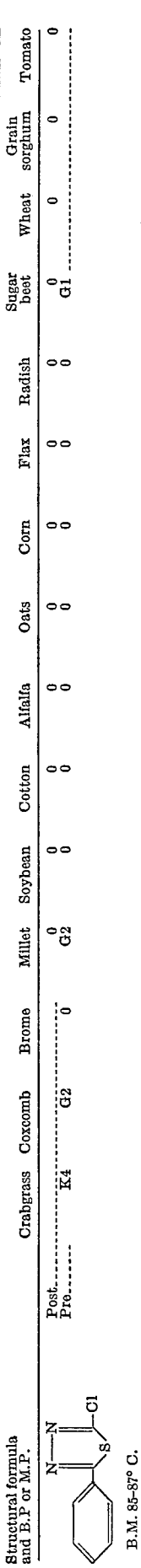 B.M. 85-87° C. | Post...... Pre...... | K4 | G2 | 0 | 0 G2 | 0 0 | 0 0 | 0 0 | 0 0 | 0 0 | 0 0 | 0 0 | 0 G1 | 0 0 | 0 0 | 0 0 |
| 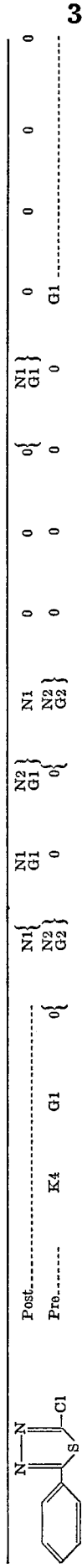 M.P. 90-93° C. | Post...... Pre...... | K4 | G1 | 0{ 0 | N1{ N2 G2 | N1 G1 0 | N2 G1 0 | N1{ G2 N2 | 0 0 | 0 0 | 0{ 0 | N1{ G1 0 | 0 G1 | 0 0 | 0 0 | 0 0 |
| 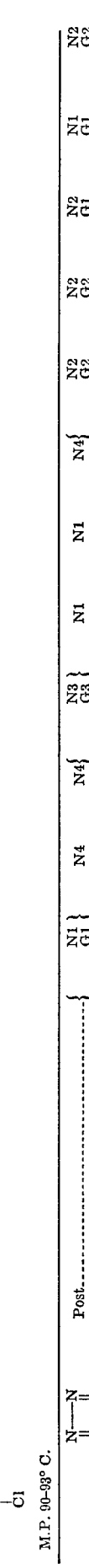 M.P. 117-119° C. | Post...... Pre...... | K4 | G2 | { 0 | N1{ G1 G2 | N4 0 | N4{ G1 | N3{ G3 N4 | N1 0 | N1 0 | N4{ G2 | N2{ G2 0 | N2{ G1 G2 | N2 G1 | N1 G1 | N2 G2 |
| 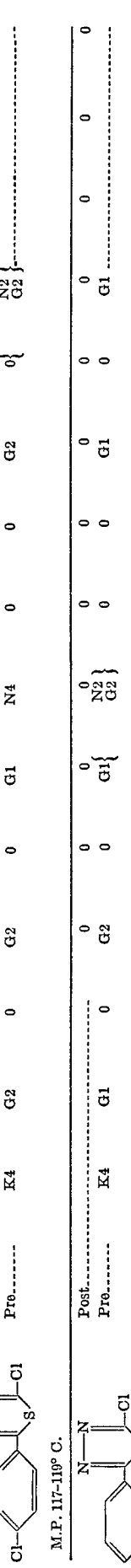 M.P. 46-47° C. B.P. 120-130° C./0.35-0.60 mm. | Post...... Pre...... | K4 | G2 | 0 | 0 G2 | 0 0 | 0 G1 | N2{ G2 | 0 0 | 0{ 0 | 0 G1 | 0 0 | 0 G1 | 0 0 | 0 0 | 0 0 |
|  M.P. 74-79° C. | Post...... Pre...... | K4{ K3 | G3 | 0 | N1 0 | N1 G1 0 | N1{ G1 0 | 0 N3{ G3 | 0 0 | 0{ 0 | N1{ G1 | N1{ G1 0 | N1{ G1 G2 | 0 0 | 0 0 | N1 |
| 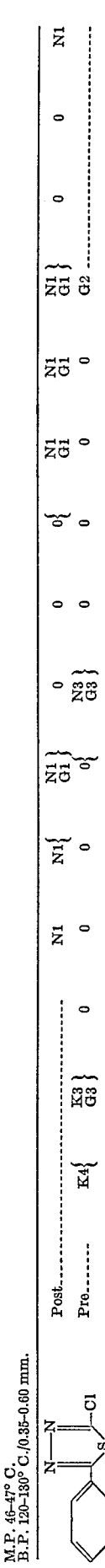 M.P. 71-78° C. | Post...... Pre...... | K4 | G2 | | N1{ G2 | N3 G2 0 | N2 G2 G1 | N1{ G1 N4 | 0 0 | N1 0 | N1{ G1 | N1{ G1 0 | N1 G1 N2 G2 | 0 N1{ G1 | 0 | N1 G1 |

The extraordinarily selective nature of the herbicidal action of this class of compounds is clearly evident from the test results. It is this property which makes it possible to combat crabgrass with minimum injury to desirable plant life, particularly turf grasses and grain crops.

USE AS ALGICIDES

So as to demonstrate the control of algae with the chemicals, small open-mouthed glass vials containing 15 ml. of a suspension of Chlorella sp. in water were placed beside the potted plants and sprayed at the same time as the plants in the greenhouse tests. The spraying produced a concentration of 8.6 p.p.m. of the test chemical in each vial.

All the compounds exhibited algicidal activity at 8.6 p.p.m. in aqueous media containing growing algae. The following four compounds were also effective at 1 p.p.m. concentration.

2-chloro-5-phenyl-1,3,4-thiadiazole
2-chloro-5-(3-methylphenyl)-1,3,4-thiadiazole
2-chloro-5-(2-chlorophenyl)-1,3,4-thiadiazole
2-chloro-5-(4-chlorophenyl)-1,3,4-thiadiazole These compounds are preferred for combating algae in cooling water ponds, reservoirs, tanks and irrigation ditches because they may be used at concentrations so low as to be practically harmless to plant and animal life.

I claim:

1. Combating crabgrass by applying preemergently to the locus of the crabgrass seeds an effective amount of a 2-chloro-5-aryl-1,3,4-thiadiazole having the structural formula

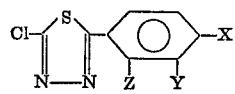

in which X, Y and Z are selected from the group consisting of hydrogen, chloro and methyl substituents.

2. Combating algae by applying to the locus of the algae an effective amount of a compound having the generic structural formula

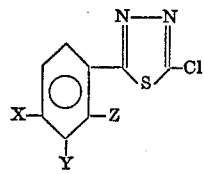

in which X, Y and Z are selected from the group consisting of hydrogen, chloro and methyl substituents.

References Cited

UNITED STATES PATENTS 3,522,267   6/1970   Duerr et al. ---------- 71—90

JAMES O. THOMAS, JR., Primary Examiner

U.S. Cl. X.R.

71—90; 260—302